US008637114B2

(12) United States Patent
Wyres et al.

(10) Patent No.: US 8,637,114 B2
(45) Date of Patent: Jan. 28, 2014

(54) LASER IMAGEABLE PAPER

(75) Inventors: Christopher Wyres, Cheshire (GB); Anthony Jarvis, Cheshire (GB); Martin Walker, Cheshire (GB); William Green, Cheshire (GB)

(73) Assignee: Datalase Ltd, Cheshire (GB)

( * ) Notice: Subject to any disclaimer, the term of this patent is extended or adjusted under 35 U.S.C. 154(b) by 214 days.

(21) Appl. No.: 13/060,997

(22) PCT Filed: Aug. 26, 2009

(86) PCT No.: PCT/GB2009/051066

§ 371 (c)(1), (2), (4) Date: Mar. 23, 2011

(87) PCT Pub. No.: WO2010/026408

PCT Pub. Date: Mar. 11, 2010

(65) Prior Publication Data

US 2011/0171438 A1 Jul. 14, 2011

(30) Foreign Application Priority Data

Sep. 3, 2008 (GB) .................................. 0815999.8
Apr. 2, 2009 (GB) .................................. 0905785.2

(51) Int. Cl.
*G11B 7/00* (2006.01)

(52) U.S. Cl.
USPC ............ 427/150; 430/945; 503/200; 503/201

(58) Field of Classification Search
USPC .................... 427/150; 503/200, 201; 430/945
See application file for complete search history.

(56) References Cited

U.S. PATENT DOCUMENTS

| | | | | |
|---|---|---|---|---|
| 5,095,134 | A | 3/1992 | Liu | |
| 6,306,493 | B1 | 10/2001 | Brownfield | |
| 7,485,403 | B2 * | 2/2009 | Khan | 430/270.1 |
| 8,048,605 | B2 * | 11/2011 | Khan et al. | 430/270.1 |

FOREIGN PATENT DOCUMENTS

| | | | |
|---|---|---|---|
| WO | WO 92/07298 | | 4/1992 |
| WO | WO 02/074548 | | 9/2002 |
| WO | WO 2005/068207 | * | 7/2005 |
| WO | WO 2006/018640 | | 2/2006 |
| WO | WO 2006/129086 | | 12/2006 |

* cited by examiner

*Primary Examiner* — Bruce H Hess
(74) *Attorney, Agent, or Firm* — Saliwanchik, Lloyd & Eisenschenk

(57) ABSTRACT

A method of manufacturing a paper substrate comprising a color former which is capable undergoing a light activated color change reaction, wherein the color former is applied to the paper substrate during the manufacture of said paper substrate, and the color former is a metal oxyanion or a molecular organic. A paper substrate obtainable by this method is also provided.

19 Claims, No Drawings

LASER IMAGEABLE PAPER

CROSS REFERENCE TO A RELATED APPLICATION

This application is a National Stage Application of International Application Number PCT/GB2009/051066, filed Aug. 26, 2009; which claims priority to Great Britain Application No. 0815999.8, filed Sep. 3, 2008 and Great Britain Application No. 0905785.2 filed Apr. 2, 2009; all of which are incorporated herein by reference in their entirety.

FIELD OF THE INVENTION

The present invention relates to novel methods of making a paper substrate comprising a colour former which is capable of undergoing a light activated colour change reaction, and to paper substrates obtainable by these methods.

BACKGROUND TO THE INVENTION

WO02/074548, WO06/018640, WO07/045912 teach paper that has been surface coated with a light activated colour change technology. The light activated colour change technology is firstly formulated into a liquid ink together with a binder and compatible liquid carrier. The liquid ink is then coated onto the paper using a printing technique such as flexography. Drying the substrate then removes the carrier to leave the light activated colour change technology bound to the surface of the paper by the binder. This technique has several drawbacks such as the use of a wasteful and time consuming printing stage.

U.S. Pat. No. 6,306,493 teaches paper and board products comprising micronized polymers such as linear aromatic polyesters and/or linear polyarylenes as the absorber material and the material for carbonization. This method however, only produces grey-scale brown-burn marks.

SUMMARY OF THE INVENTION

In accordance with a first aspect of the invention there is provided a method of making a paper substrate comprising a colour former which is capable undergoing a light activated colour change reaction, wherein the colour former is applied to the paper substrate during the manufacture of said paper substrate, and the colour former is metal oxyanion or a molecular organic.

In accordance with a second aspect of the invention there is provided a paper substrate obtainable by a method according to the first aspect of the invention.

We have found that certain light activated colour change agents (hereinafter referred to as "colour formers") can be included into paper, i.e. substrates made from cellulose pulps, as the paper is being made. The result is paper substrates that can be directly imaged using light, without the need for a secondary printing application. The fact that the colour formers can be incorporated in this manner is surprising as paper making involves harsh physical and chemical processing stages which could potentially degrade the colour formers as they are applied to the paper. The colour formers used in the present invention are also advantageous since they produce multi-colour marks and black marks rather than brown burn marks.

DETAILED DESCRIPTION OF INVENTION

The paper substrates of the present invention are materials made substantially from cellulose pulp, which can be derived mainly from wood, textiles, and certain grasses such as flax, and processed into flexible sheets or rolls by deposit from an aqueous suspension. The term "paper substrates" encompasses all 'non-woven' type cellulose pulp substrates such as paper, board, card and corrugated.

Paper substrates generally consist of mechanical and/or chemical derived cellulose pulp and, if desired, synthetic fibres and auxiliaries, such as fillers, binders for sizing, retention aids, optical brighteners and dyes. The colour formers used in the present invention can be incorporated into the body of the paper in various ways. They can, for example, be mixed with the chemical and/or mechanical pulp in dry form. Alternatively, they can be admixed with fibrous stock made from chemical and/or mechanical pulp. A homogeneous distribution of the colour formers is likewise achieved if they added to the individual components of the papermaking auxiliary. It is particularly preferable to add the colour formers to the binder necessary for sizing the paper. However, it is also possible to delay adding the colour formers until the fibrous stock is mixed with the papermaking auxiliaries. The finished paper stock then goes to a paper-making machine.

The raw paper with the colour formers is generally coated one or more times on one or both sides. It is likewise possible to incorporate the colour formers into the coating material. The absorber material may also be incorporated into the paper or board product by coating the raw paper without absorber material, using a coating composition that includes the colour former. In this case, the colour former is present only in the coating material and not in the actual body of the paper. This can be done at the finishing stage of the papermaking process thereby negating the need for a separate printing stage during downstream processing.

The fibrous materials used, besides mechanical and chemical pulp, are particularly modified mechanical pulps, such as thermomechanical pulp and chem-thermo-mechanical pulp and/or mixtures of these types of pulp. It is furthermore also possible to use reclaimed chemical pulp from used paper. The fibers mentioned can also comprise a proportion of man-made fibers, in particular cellulose derivatives, cellulose ethers, cellulose acetate, viscose fibers and carbon fibers, polyethylene and polypropylene, polyvinyl alcohol, acrylonitrile (co) polymers and polyamides, e.g., heat resistant aramid fibers.

To improve smoothness, printability and opacity of the paper, fillers, such as $CaCO_3$, $BaSO_4$, $Al(OH)_3$, $CaSO_4$, ZnS, $SiO_2$, chalk, $TiO_2$, clays and kaolin are added to the fibrous starting materials. These fillers are also used as coating pigments for improving surface quality in coating compositions or cast coatings.

Another important constituent of the papermaking auxiliaries are the binders, such as starch, casein, proteins, plastics dispersions, resin sizes, etc., for strengthening the fiber structure, binding fillers and pigments, increasing water-resistance and improving inscribability and printability.

Particularly good imaging results are obtained if the binder is mixed with the colour formers and this mixture is mixed with mechanical and/or chemical pulp, in solid or liquid form.

Binders which are particularly suitable are solvent-free sizes which are also used in paper coating, coating and impregnation. Preferred binders are cationic resin sizes, colophonium, modified colophonium esters, synthetic alkyldiketenes and alkyl diacrylates. Other useful binders are vinyl-acetate-based and acrylate-resin-based plastics dispersions and in particular, water-soluble dispersions of polyvinyl alcohol, polyvinyl methyl ether, polyacrylic acid salts and copolymers, polyvinyl pyrrolidone and water-soluble cellulose ethers. In the case of coated paper, the raw paper is preferably coated with binders from the range of copolymers of styrene and butadiene. The above mentioned binders may likewise be used in the finishing of the paper.

The retention aids used during papermaking to retain fines and fillers are, in particular, aluminum sulfate and synthetic cationic compounds, such as ethyleneimine polymers.

It is advisable to use dispersants, since the colour formers should be distributed very homogeneously in the body of the paper so that uniform and clear imaging can be achieved. Examples of suitable dispersants are Byk 410 (Byk-Chemie), Laponite RD/RDS (Laporte), Calgon neu (BK Ladenburg) and Polysalz SK (BASF).

Depending on the grade of paper in the body of the paper, optical brighteners are frequently added to increase whiteness.

Besides dyes and pigments for coloring the body of the paper or for use in coating compositions, for coloration of the surface in a preferred embodiment, the paper may also contain flame retardants.

Besides the usual papermaking auxiliaries (including those discussed above), it is also possible to add other additives not mentioned here to the paper stock.

The paper substrate comprising colour formers may be used in any sector where paper has hitherto been inscribed using conventional ink-jet processes or laser-marking by ablation of printing inks. Inscriptions and distinguishing images can be made with the aid of laser light on, for example, labels, any type of paper packaging for household products and consumer goods, wrapping paper, cigarette packaging and cosmetics, even at positions which are difficult to access.

Another important application sector for laser inscription is in graphic products which have a permanent and counterfeit-proof marking, while also meeting the high aesthetic demands for high-quality packaging printing.

In graphic design products, direct laser marking, coding and inscription of paper or board product is not possible without printing-on of additional fields (black and white areas) to see any contrast. According to the present invention, graphic products made of paper containing colour formers can be marked even at positions which are difficult to access.

Another application of this invention is in securities/security papers and financial papers, for example: banking papers for use in currency, banknotes, cheques and the like, invoices, tickets, tags and security documents such as passports, licenses and the like.

The marked paper products and board products can moreover be subsequently printed and further processed, for example surface-coating, laminating or sealing, without an adverse effect on their markability. Indeed, the paper substrate comprising colour formers may additionally be over printed with traditional inks and surface coating formulations using techniques such as inkjet, flexography and the like.

The paper products comprising the colour formers of the present invention can also be used in multi-layer constructions, such as laminates. Light can pass through many substrates, allowing covert or overt images to be created or embedded in the multi-layer structure. The substrates can also be opaque in regions other than the wavelength of the irradiating light.

The colour formers used in the present invention are metal oxyanions and molecular organics such as those taught in WO06/129086, WO07/045912, WO02/068205, WO06/129078, WO04/043704, WO02/074548, WO06/018640, WO07/063339 and WO06/051309. By "molecular organic" we mean any organic molecule which exists in the form of a discrete molecule, as opposed to in the form of polymeric chains with repeating units. Diacetylenes, as detailed below, may be used. The "molecular organic" refers to the monomers used to form the diacetylenes in their pre-polymerised form. Preferred metal oxyanions include molybdates and borates. Particularly preferred are octamolybdates and metaborates. More particularly preferred still are ammonium octamolybdate and sodium metaborate. Preferred molecular organics are diacetylenes, leuco dyes and charge transfer agents. Any combination of these, or any other, colour formers can be used.

Any diacetylene or combination of diacetylene and other substances capable of undergoing a colour change reaction upon exposure to light may be used in the present invention.

Diacetylene compounds are substances which include at least one diacetylene group, i.e. —C≡C—C≡C—. Particularly preferred are diacetylene compounds that exhibit a polychromic colour change reaction. These compounds are typically initially colourless but on exposure to suitable light, such as a ultra-violet light, undergo a colour change reaction to produce a blue colour. Certain diacetylenes in their blue form can then be exposed to further stimuli such as heat or near-infrared light, which converts the blue form into a magenta, red, yellow and green form.

Specific examples of diacetylene compounds may be used in the present invention are given in the published patent application numbers WO2006/018640, WO2009/081385 and WO2009/093028.

Further examples include those represented by the following general structures:

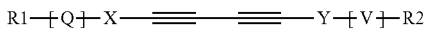

or,

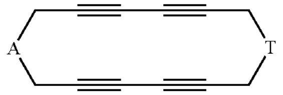

or,

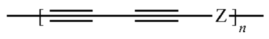

or,

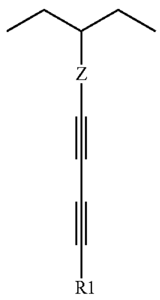

wherein,

X and Y are divalent straight-chain or branched alkylene type groups $(—CH_2—)_n$ wherein n=0 to 24, or a divalent phenylene type group $(—C_6H_4—)_n$ wherein n=0 to 1 or a combination of both types;

Q and V, if present, are divalent bridging groups such as —S—, —O—, —NHR'— (wherein R' is hydrogen or alkyl), amide, ester or thioester groups, carbonyl or carbamate;

R1 and R2 are H or alkyl;

A and T are divalent groups that can either be an alkylene or phenylene type such as X or Y, or a bridging type such as Q or V, or a combination of both types, X or Y that additionally comprises a Q or V group;

Z is a divalent group such as X or Q or a combination of both, X that additionally comprises a Q group, or Z can be not present, and n is 2 to 20,000,000.

Groups X and Y are optionally substituted, preferably at the α, β or γ position with respect to the diacetylene group. For instance, there may be an α-hydroxy group, as shown in the formula below:

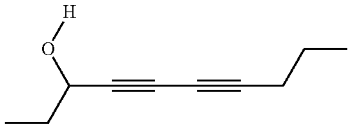

The diacetylene may be symmetrical or non-symmetrical.

Q and V are optionally substituted with groups such as amine, alcohol, thiol or carboxylic acid. Both Q and V may be present, or alternatively, just Q.

Where R1 and R2 in the above compounds are alkyl, they may be straight or branched chain and may additionally comprise other functional groups known in organic chemistry such as alcohol, amine, carboxylic acid, aromatic ring systems and unsaturated groups such as alkenes and alkynes.

Groups R1, R2, Q, V, X and Y may comprise ionic groups, which can be anionic or cationic. Examples include sulphate groups (—$SO_3$—) and ammonium groups. The ionic groups can have any suitable counterion. The diacetylene can be anionic, cationic, non-ionic or zwitterionic.

Further diacetylene compound examples are diacetylene carboxylic acids and derivatives thereof. A particularly preferred diacetylene carboxylic acid compounds are 10,12-pentacosadiynoic acid and 10,12-docosadiyndioic acid and their derivatives thereof. Further examples include: 5,7,-dodecadiyndioic acid, 4,6-dodecadiynoic acid, 5,7-eicosadiynoic acid, 6,8-heneicosadiynoic acid, 8,10-heneicosadiynoic acid, 10,12-heneicosadiynoic acid, 10,12-heptacosadiynoic acid, 12,14-heptacosadiynoic acid, 2,4-heptadecadiynoic acid, 4,6-heptadecadiynoic acid, 5,7-hexadecadiynoic acid, 6,8-nonadecadiynoic acid, 5,7-octadecadiynoic acid, 10,12-octadecadiynoic acid, 12,14-pentacosadiynoic acid, 2,4-pentadecadiynoic acid, 5,7-tetradecadiynoic acid, 10,12-tricosadiynoic acid 2,4-tricosadiynoic acid, and derivatives thereof. Diacetylene alcohols and diol compounds and derivatives thereof are also preferred, examples include: 5,7-dodecadiyn-1,12-diol, 5,7-eicosadiyn-1-ol, 2,4-heptadecadiyn-1-ol, 2,4-hexadiyn-1,6-diol, 3,5-octadiyn-1,8-diol, 4,6-decadiyn-1,10-diol, 2,7-dimethyl-3,5-octadiyn-2,7-diol, 14-hydroxy-10,12-tetradecadiynoic acid. Others include 1,6-diphenoxy-2,4-hexadiyne, 1,4-diphenylbutadiyne, 1,3-heptadiyne, 1,3-hexadiyne and 2,4-hexadiyne.

A combination of different diacetylenes can also be employed. A particularly preferred combination is that of 10,12-pentacosadiynoic acid or 10,12-docosadiyndioiac acid and derivatives thereof and 2,4-hexadiyn-1,6-diol. 10,12-pentacosadiynoic acid can produce blue, red and yellow. 2,4-hexadiyn-1,6-diol can produce a cyan colour. Activating 10,12-pentacosadiynoic acid to yellow and 2,4-hexadiyn-1,6-diol to cyan simultaneously gives rise to green.

A diacetylene compound that is 'activatable', i.e. has a first solid form that is relatively unreactive to light, but upon 'activation' is transformed into a second form that is relatively reactive to light and is thus capable of undergoing a colour change reaction to create a visible image, has particular utility in the present invention. Without being limited by theory the activation could be a re-crystallisation, crystal form modification, co-crystal combination or a melting/re-solidification process.

Reversibly activatable diacetylenes that can flip between unactivated and activated forms in response to a stimulus or removal of a stimulus also form part of the present invention.

Particularly preferred diacetylenes are those that after initial melting and re-solidification activation are colourless but become blue on exposure to light, particularly UV light. The most preferred diacetylenes compounds are carboxylic acids and derivatives thereof where:

$$R—C\equiv C—C\equiv C—R'$$

either R and/or R' comprises a COX group, where X is: —NHY, —OY, —SY, where Y is H or any group comprising at least one carbon atom.

Particularly preferred still are derivatives in which the carboxylic acid group has been functionalised into an amide, ester or thioester, with amides being particularly preferred. These can be easily made by reacting a diacetylene carboxylic acid with a chlorinating agent such as oxalyl chloride and then reacting the diacetylene acid chloride with a nucleophilic compound such as an amine, alcohol or thiol. A particularly preferred diacetylene carboxylic acid compound is 10,12-docosadiyndioic acid and derivatives thereof such as amides, esters, thioesters and the like. Especially particularly preferred 10,12-docosadiyndioic acid derivatives are amides. A particularly preferred still 10,12-docosadiyndioic acid amide derivative is the propargylamide in which at least one, preferably both carboxylic acid groups have been transformed into the propargylamide, as shown below:

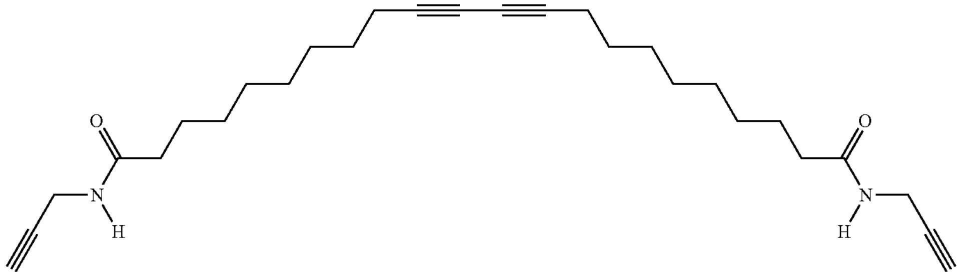 [SMILES: C#CCNC(=O)CCCCCCCCC#CC#CCCCCCCCCC(=O)NCC#C]

Propargylamides are made by reacting carboxylic acids with propargylamine. Other preferred amines that can be used to create suitable amides include: dipropargylamine and 1,1-dimethylpropargylamine.

The activatable diacetylene is generally used together with a NIR light absorbing agent, which is a compound that absorbs light in the wavelength range 700 to 2500 nm.

A NIR light source, such as a NIR fibre laser, is used to heat the diacetylene only in the areas where the image is required. A UV light source, such as a germicidal lamp, is then used to flood the paper substrate with UV light. However, the diacetylene compound only undergoes a colour change reaction to create an image in the areas which were initially exposed to NIR light. The areas of the coating unexposed to NIR light undergo a negligible colour change reaction, remain essentially colourless, and are stable to background radiation. A thermal print head may be used to initiate the heat-based pre-activation step.

Specific examples of NIR light absorbing agents include:

i. Organic NIR absorbing agents ii. NIR absorbing 'conductive' polymers iii. Inorganic NIR absorbing agents iv. Non-stoichiometric inorganic absorbing agents.

Particularly preferred NIR absorbing agents are those that have essentially no absorbance in the visible region of the spectrum (400 to 700 nm) and thus give rise to coatings that appear visibly colourless.

Organic NIR absorbing agents are known as NIR dyes/pigments. Examples include but are not limited to: families of metallo-porphyrins, metallo-thiolenes and polythiolenes, metallo-phthalocyanines, aza-variants of these, annellated variants of these, pyrylium salts, squaryliums, croconiums, amminiums, diimoniums, cyanines and indolenine cyanines.

Examples of organic compounds that can be used in the present invention are taught in U.S. Pat. No. 6,911,262, and are given in Developments in the Chemistry and Technology of Organic dyes, J Griffiths (ed), Oxford: Blackwell Scientific, 1984, and Infrared Absorbing Dyes, M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765 and IR788; and the Pro-Jet™ series of dyes supplied by FujiFilm Imaging Colorants, Blackley, Manchester, UK, particularly Pro-Jet™ 830NP, 900NP, 825LDI and 830LDI. Further examples are taught in WO08/050153.

Examples of NIR absorbing 'conductive' polymers include PEDOT such as, the product Baytron® P supplied by HC Starck. Further examples are taught in WO05/12442.

Examples of inorganic NIR absorbing agents include copper (II) salts. Copper (II) hydroxyl phosphate (CHP) is particularly preferred. Further examples are taught in WO05/068207. CHP is particularly preferred in combination with a NIR fibre laser operating with a wavelength of approximately 1 micron.

Examples of non-stoichiometric inorganic absorbing agents include reduced indium tin oxide, reduced antimony tin oxide, reduced titanium nitrate and reduced zinc oxide. Further examples are taught in WO05/095516. Reduced indium tin oxide is particularly preferred in combination with a 1550 nm to 2500 nm laser.

It is particularly preferred if the absorption profile of the NIR absorbing agent approximately matches the emission wavelength(s) of the NIR light source employed.

Other light absorbing agents that can be used, instead of the NIR absorbing agent include UV (120 to 400 nm), visible (400 to 700 nm) and mid-infrared (~10.6 microns) light absorbing agents. Examples includes dyes/pigments, UV absorbers and Iriodin type agents.

Charge transfer agents may be used together with a diacetylene in the present invention. These are substances that are initially colourless but react with protons ($H^+$) to produce a coloured form. Charge transfer agents that form part of the present invention include compounds known as carbazoles and suitable examples are described in WO2006/051309. Further charge transfer agents known to those skilled in the art such as leuco dyes can also be used. Charge transfer agents are usually used in combination with other substances such as light absorbing agents which can be wavelength specific, heat generating agents, acid generating agents and the like.

A particularly preferred combination for use in this invention is a diacetylene such as 10,12-pentacosaidiynoic acid, or 10,12-docosadiyndioic acid (or a derivative thereof), to give blue and red, with a charge transfer agent that generates green.

Leuco dyes can be any number of colourants that exhibit colour change or formation upon exposure to certain types of radiation. Non-limiting examples of suitable leuco dyes include fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, phthalocyanine precursors (such as those available from Sitaram Chemicals, India), and mixtures thereof. Experimental testing has shown that fluoran based dyes are one class of leuco dyes which exhibit desirable properties. Additionally, phthalides and aminotriarylmethanes can also be desirable for use in certain applications. Further suitable leuco dyes are described in "Dyestuffs and Chemicals for Carbonless Copy Paper" presented at Coating Conference (1983, San Francisco, Calif. pp 157-165) by Dyestuffs and Chemicals Division of Ciba-Geigy Corp Greenboro, N.C. Certain leuco dyes are understood to exhibit halochromism and be colourless in neutral or alkaline media, but become coloured when they react with an acidic, proton donating or electron-accepting substance. Suitable examples include compounds such as triphenylmethanephthalide compounds, azaphthalide compounds, isoindolide phthalide compounds, vinylphthalide compounds, spiropyran compounds, rhodamine lactam compounds, lactone and dilactone compounds, benzoyl leuco methylene blue (BLMB), derivatives of bis-(p-di-alkylaminoaryl)methane, xanthenes, indolyls, auramines, chromenoindol compounds, pyrollo-pyrrole compounds, fluorene compounds, and fluoran and bisfluoran compounds, with fluoran compounds being preferred. Particularly preferred commercial leuco dye products include the Pergascript range made by Ciba Speciality Chemicals, Basel, Switzerland, those by Yamada Chemical Co. Ltd, Kyoto, Japan, those marketed by Nippon Soda and those supplied by BF Goodrich Corp., Cincinnati, Ohio.

Further examples of suitable leuco dye type colour forming systems are taught in EP1827859, WO2006052843 and WO2007114829.

Charrable agents may be used in the present invention. These are agents that will char or undergo a caramelisation reaction to yield a contrasting mark. Examples include carbohydrates, polysaccharides, sugars, gums, starches and the like. Further examples include: glucose, sucrose, saccharose, polydextrose, maltodextrin (of any DE), locust bean gum, guar gum, starch, reducing carbohydrates and alginates and the like. It is preferred if the charrable agent is used in combination with a base such as sodium bicarbonate. It is particularly preferred if sodium metaborate is used in combination with a charrable agent.

Other components that may be added include compounds comprising nucleophilic groups such as amines. Examples include ethanolamine and aminoacids and aminocarbohydrates such as glycine, and D-glucosamine. Ammonium salts such as ammonium sulphate and ammonium phosphate dibasic can also be added. Further examples are taught in WO2008083912 and WO2008107345.

Other colour change chemistries suitable for use in the present invention are taught in WO2009/003976, WO2002/006058, U.S. Pat. No. 6,903,153, WO2007/114829, WO2006/063165, US20070098900, WO2007/088104, EP2085437, WO2009/024497, WO2009/010405, WO2009/010393, WO2008107345, WO2008083912, WO2007088104, WO2007031454 and WO2007012578.

The substrate may also comprise a photo or thermal acid or base generating agent. A photoacid generating agent is a substance that on exposure to light generates an acidic environment, usually by liberating protons. A thermal acid generating agent is a substance that on exposure to heat generates an acidic environment, usually by liberating protons. Preferred acid generator examples include 'onium' type compounds such as sulphonium or iodonium salts, and triflates. Examples include the Cyracure products supplied by Dow. It is particularly preferred to include an acid generator when using halochromic leuco dyes or charge transfer agents.

Conversely, a photobase generating agent is a substance that on exposure to light generates a basic environment, usually by scavenging protons. A thermal base generating agent is a substance that on exposure to heat generates a basic environment, usually by scavenging protons.

The light used to image the substrates of the present invention can have an emission wavelength in the region 120 nm to 20 microns. It can be monochromatic or broad band. It can be non-coherent or laser radiation. The laser radiation can be pulsed or continuous wave. The laser can be a UV, visible, near-infrared or mid-infrared laser. The laser can be a $CO_2$ laser, a fibre laser, a Nd:YAG laser, a solid state laser, an excimer laser, a diode laser, or a diode array.

Laser radiation is particularly preferred as lasers can be controlled by computers with appropriate software to produce digital printing. The image produced can be human readable text, pictures or devices, or machine readable codes such as barcodes and the like.

The invention will now be illustrated by the following Examples.

EXAMPLES

The following papers were made using both chemical pulp and thermomechanical pulp.

Example 1

Base paper having a weight per unit area of about 70 $gm^{-2}$ and comprising:

Fiber: 100% pulp beaten to about 30° SR.

Sizing agent 0.5%

Ammonium octamolybdate 5% (ex. Climax Molybdenum)

The paper was imaged using a Videojet 3320 30 W $CO_2$ laser to produce human readable text and machine readable barcodes.

Example 2

Base paper having a weight per unit area of about 70 $gm^{-2}$ and comprising:

Fiber: 100% of pulp beaten to about 30° SR.

Sizing agent 0.5%.

Sodium metaborate tetrahydrate 10% (ex. Aldrich)

The paper was imaged using a Videojet 3320 30 W $CO_2$ laser to produce human readable text and machine readable barcodes.

Example 3

Base paper having a weight per unit area of about 70 $gm^{-2}$ and comprising:

Fiber: 100% of pulp beaten to about 30° SR.

Sizing agent 0.5%.

Ammonium octamolybdate 5% (ex. Climax Molybdenum) and copper (II)

hydroxide phosphate 5% (Fabulase 322, ex. Budenheim).

The paper was imaged using a 1070 nm, 30 W fibre laser to produce human readable text and machine readable barcodes.

Example 4

Base paper having a weight per unit area of about 70 $gm^{-2}$ and comprising:

Fiber: 100% of pulp beaten to about 30° SR.

Sizing agent 0.5%.

10,12-Pentacosadiynoic acid 2% (ex. GFS Chemicals).

The paper was imaged using a 266 nm, 5 W UV laser to produce human readable text and machine readable barcodes in multi-colours.

Example 5

Base paper having a weight per unit area of about 70 $gm^{-2}$ and comprising:

Fiber: 100% of pulp beaten to about 30° SR.

Sizing agent 0.5%.

10,12-Pentacosadiynoic propargylamide 2% (made in-house by reacting 10,12-pentacosadinyoic acid via its acid chloride with propargylamine).

The paper was imaged using a 266 nm, 5 W UV laser to produce human readable text and machine readable barcodes in multi-colours.

Example 6

Base paper having a weight per unit area of about 70 $gm^{-2}$ and comprising:

Fiber: 100% of pulp beaten to about 30° SR.

Sizing agent 0.5%.

Bis-10,12-Pentacosadiynoic butylamide 2% (made in-house by reacting 10,12-pentacosadinyoic acid via its acid chloride with 1,4-diaminobutane).

The paper was imaged using a 266 nm, 5 W UV laser to produce human readable text and machine readable barcodes in multi-colours

Example 7

Base paper having a weight per unit area of about 70 $gm^{-2}$ and comprising:

Fiber: 100% of pulp beaten to about 30° SR.

Sizing agent 0.5%.

Yamada ETAC leuco dye 2.5% and Cyracure UVI Photoinitiator UVI-6992 photoacid generator 5% (ex. Dow).

The paper was imaged using a 355 nm, 5 W UV laser to produce human readable text and machine readable barcodes in multi-colours.

Example 8

Base paper having a weight per unit area of about 70 $gm^{-2}$ and comprising:

Fiber: 100% of pulp beaten to about 30° SR.

Sizing agent 0.5%.

Pergascript Blue SRB-P 1% (ex. Ciba), Yamada Yellow Y-726 2% (ex. Yamada), Cyracure UVI Photoinitiator UVI-6992 4% (ex. Dow) and 10,12-Pentacosadiynoic acid 2.5% (ex. GFS Chemicals).

Red and blue images were produced using a 266 nm UV laser, and green image produced using a 355 nm UV laser. These images were produced independently of each other.

The invention claimed is:

1. A method of manufacturing a paper substrate comprising a colour former which is capable of undergoing a light activated colour change reaction, wherein the colour former is applied to the paper substrate during the manufacture of said paper substrate, and the colour former is a metal oxyanion, a molecular organic or combination thereof, wherein the colour former is incorporated into the body of the paper substrate.

2. The method according to claim 1, wherein the paper substrate is paper, board, card, corrugated or a laminate.

3. The method according to claim 1, wherein the colour former is applied to the paper substrate at the sizing stage of manufacture.

4. The method according to claim 1, wherein the metal oxyanion is a molybdate or a borate.

5. The method according to claim 4, wherein the molybdate is octamolybdate.

6. The method according to claim 4, wherein the borate is a metaborate.

7. The method according to claim 1, wherein the molecular organic is a diacetylene, leuco dye, or charge transfer agent.

8. The method according to claim 7, wherein the diacetylene is 10,12-pentacosadiynoic acid or 10,12-docosadiyndioic acid or a derivative thereof.

9. The method according to claim 1, which further comprises applying an acid or base generating agent to the paper substrate.

10. The method according to claim 1, which further comprises applying an energy absorbing agent to the paper substrate.

11. The method according to claim 10, wherein the energy absorbing agent is copper(II) hydroxide phosphate, a reduced metal or mixed metal oxide, a conductive polymer or an organic MR dye/pigment.

12. The method according to claim 10, wherein the energy absorbing agent is a near infrared absorbing agent.

13. The method according to claim 1, wherein the colour former is capable of producing multi-colour images.

14. A paper substrate obtainable by a method according to claim 1.

15. An item made from a paper substrate according to claim 14.

16. A method of imaging a paper substrate according to claim 14, comprising directing light radiation at the paper substrate.

17. The method according to claim 16, wherein the light radiation is provided by a laser.

18. An imaged paper substrate obtainable by the method of claim 16.

19. The method according to claim 16, wherein the light radiation has an emission wavelength in the region 120 nm to 20 microns.

* * * * *